United States Patent
Amidon et al.

(10) Patent No.: US 7,853,712 B2
(45) Date of Patent: Dec. 14, 2010

(54) ACTIVITY INDICATORS IN A MEDIA SHARING SYSTEM

(75) Inventors: Christopher M. Amidon, Apex, NC (US); Harold Sutherland, San Jose, CA (US); Hugh Svendsen, Chapel Hill, NC (US)

(73) Assignee: Eloy Technology, LLC, Wilmington, DE (US)

( * ) Notice: Subject to any disclaimer, the term of this patent is extended or adjusted under 35 U.S.C. 154(b) by 240 days.

(21) Appl. No.: 12/239,877

(22) Filed: Sep. 29, 2008

(65) Prior Publication Data

US 2010/0082135 A1    Apr. 1, 2010

(51) Int. Cl.
    G06F 15/16    (2006.01)
(52) U.S. Cl. .................. 709/231; 709/205; 709/212; 709/214; 709/216; 709/217; 709/227; 709/248; 725/37; 725/59; 725/60; 725/61; 725/80; 707/622
(58) Field of Classification Search .................. 709/205, 709/212, 214, 216, 217, 227, 231, 248; 725/37, 725/59, 60, 61, 80; 707/622
    See application file for complete search history.

(56) References Cited

U.S. PATENT DOCUMENTS

| | | |
|---|---|---|
| 6,633,903 B1 | 10/2003 | Gould |
| 6,714,215 B1 | 3/2004 | Flora et al. |
| 6,907,458 B2 | 6/2005 | Tomassetti et al. |
| 6,953,886 B1 | 10/2005 | Looney et al. |
| 6,987,221 B2 | 1/2006 | Platt |
| 7,113,999 B2 * | 9/2006 | Pestoni et al. ................ 709/231 |
| 7,313,571 B1 | 12/2007 | Platt et al. |
| 7,333,092 B2 | 2/2008 | Zadesky et al. |

(Continued)

FOREIGN PATENT DOCUMENTS

CN    101115019 A    1/2008

(Continued)

OTHER PUBLICATIONS

Yufeng Dou et al., "An Approach to Analyzing Correlation between Songs/Artists Using iTMS Playlists," Proceedings of the International Conference on Computational Intelligence for Modelling, Control and Automation and International Conference on Intelligent Agents, Web Technologies and Internet Commerce vol. 1 (CIMCA-IAWTIC'06), vol. 1, pp. 951-956, 2005, 1 page.

(Continued)

*Primary Examiner*—Michael Won
(74) *Attorney, Agent, or Firm*—Withrow & Terranova, PLLC

(57) ABSTRACT

A system and method are provided for generating and displaying one or more indicators indicative of a level of activity within a media sharing system. In one embodiment, with respect to a user participating in the media sharing system, an indicator representative of an activity level of a media collection shared by the user in the media sharing system may be generated and presented to the user. In addition or alternatively, indicators representative of activity levels of media collections shared by other users participating in the media sharing system may be generated and presented to the user. Still further, in addition or alternatively, indicators representative of activity levels with respect to playlists in the media sharing system may be generated and presented to the user.

33 Claims, 5 Drawing Sheets

U.S. PATENT DOCUMENTS

| | | | |
|---|---|---|---|
| 7,426,537 B2 * | 9/2008 | Lee et al. | 709/204 |
| 7,483,958 B1 | 1/2009 | Elabbady et al. | |
| 7,636,509 B2 | 12/2009 | Davis | |
| 7,668,939 B2 | 2/2010 | Encarnacion et al. | |
| 7,680,814 B2 * | 3/2010 | Mercer et al. | 84/609 |
| 7,685,210 B2 | 3/2010 | Plastina et al. | |
| 7,689,510 B2 | 3/2010 | Lamkin et al. | |
| 7,696,427 B2 | 4/2010 | West et al. | |
| 7,730,216 B1 * | 6/2010 | Issa et al. | 709/250 |
| 2003/0032419 A1 | 2/2003 | Shibasaki et al. | |
| 2003/0037157 A1 * | 2/2003 | Pestoni et al. | 709/231 |
| 2003/0093790 A1 * | 5/2003 | Logan et al. | 725/38 |
| 2005/0154608 A1 | 7/2005 | Paulson et al. | |
| 2006/0044466 A1 | 3/2006 | Kelly et al. | |
| 2006/0069998 A1 | 3/2006 | Artman et al. | |
| 2006/0143236 A1 | 6/2006 | Wu | |
| 2006/0179078 A1 | 8/2006 | McLean | |
| 2006/0195515 A1 | 8/2006 | Beaupre et al. | |
| 2006/0195902 A1 | 8/2006 | King et al. | |
| 2006/0212478 A1 | 9/2006 | Plastina et al. | |
| 2007/0033225 A1 | 2/2007 | Davis | |
| 2007/0038647 A1 | 2/2007 | Thomas et al. | |
| 2007/0048713 A1 | 3/2007 | Plastina et al. | |
| 2007/0048714 A1 | 3/2007 | Plastina et al. | |
| 2007/0061416 A1 | 3/2007 | Gould | |
| 2007/0083556 A1 | 4/2007 | Plastina et al. | |
| 2007/0168544 A1 | 7/2007 | Sciammarella | |
| 2007/0220081 A1 | 9/2007 | Hyman | |
| 2007/0244856 A1 | 10/2007 | Plastina et al. | |
| 2007/0244880 A1 | 10/2007 | Martin et al. | |
| 2007/0282949 A1 | 12/2007 | Fischer et al. | |
| 2008/0005179 A1 | 1/2008 | Friedman et al. | |
| 2008/0016205 A1 | 1/2008 | Svendsen | |
| 2008/0052371 A1 | 2/2008 | Partovi et al. | |
| 2008/0080392 A1 | 4/2008 | Walsh et al. | |
| 2008/0091717 A1 | 4/2008 | Garbow et al. | |
| 2008/0147798 A1 | 6/2008 | Paalasmaa et al. | |
| 2008/0154967 A1 | 6/2008 | Heikes et al. | |
| 2008/0205205 A1 | 8/2008 | Chiang et al. | |
| 2009/0019156 A1 | 1/2009 | Mo et al. | |
| 2009/0037005 A1 | 2/2009 | Larsen et al. | |
| 2009/0060467 A1 | 3/2009 | Grigsby et al. | |
| 2009/0080635 A1 | 3/2009 | Altberg et al. | |
| 2009/0083117 A1 | 3/2009 | Svendsen et al. | |
| 2009/0138505 A1 | 5/2009 | Purdy | |
| 2009/0164199 A1 | 6/2009 | Amidon et al. | |
| 2009/0164452 A1 | 6/2009 | Yogaratnam et al. | |
| 2009/0164600 A1 | 6/2009 | Issa et al. | |
| 2009/0177654 A1 | 7/2009 | Beaupre et al. | |
| 2009/0193338 A1 | 7/2009 | Fiatal | |
| 2009/0216859 A1 | 8/2009 | Dolling | |
| 2009/0222392 A1 * | 9/2009 | Martin et al. | 706/46 |
| 2009/0254643 A1 | 10/2009 | Terheggen et al. | |
| 2009/0265356 A1 | 10/2009 | Hyman et al. | |
| 2009/0265426 A1 | 10/2009 | Svendsen et al. | |
| 2009/0326970 A1 * | 12/2009 | Estrada et al. | 705/1 |
| 2010/0071070 A1 | 3/2010 | Jawa et al. | |
| 2010/0107117 A1 | 4/2010 | Pearce et al. | |
| 2010/0115553 A1 | 5/2010 | Van Flandern et al. | |

FOREIGN PATENT DOCUMENTS

| | | |
|---|---|---|
| WO | 2007092053 A1 | 8/2007 |
| WO | 2007137626 A1 | 12/2007 |

OTHER PUBLICATIONS

"Firefly Media Server :: Home Page," http://www.fireflymediaserver.org/, printed Feb. 3, 2009, 1 page.

"Apple—iTunes—What is iTunes?—A player, a store, and more," http://www.apple.com/itunes/whatis/, printed Aug. 11, 2009, 2 pages.

"DNS Service Discovery (DNS-SD)," http://www.dns-sd.org/, printed May 18, 2010, 4 pages.

Tallberg, Mathias, "P2P-Based Roaming Between Home WLAN Hotspots," http://whitepaper.techworld.com/wireless-networking-wlan-wi-fi/4587/p2p-based-roaming-between-home-wlan-hot-spots/, Mar. 1, 2007, 6 pages.

Wu et al., "Next Generation Mobile Multimedia Communications: Media Codec and Media Transport Perspectives," China Communications, Oct. 2006, 15 pages.

Zahariadis et al., "Scalable Content Delivery Over P2P Convergent Networks," 12th IEEE International Symposium on Consumer Electronics, (ISCE 2008), Vilamoura, Portugal, (Apr. 14-16, 2008), 4 pages.

* cited by examiner

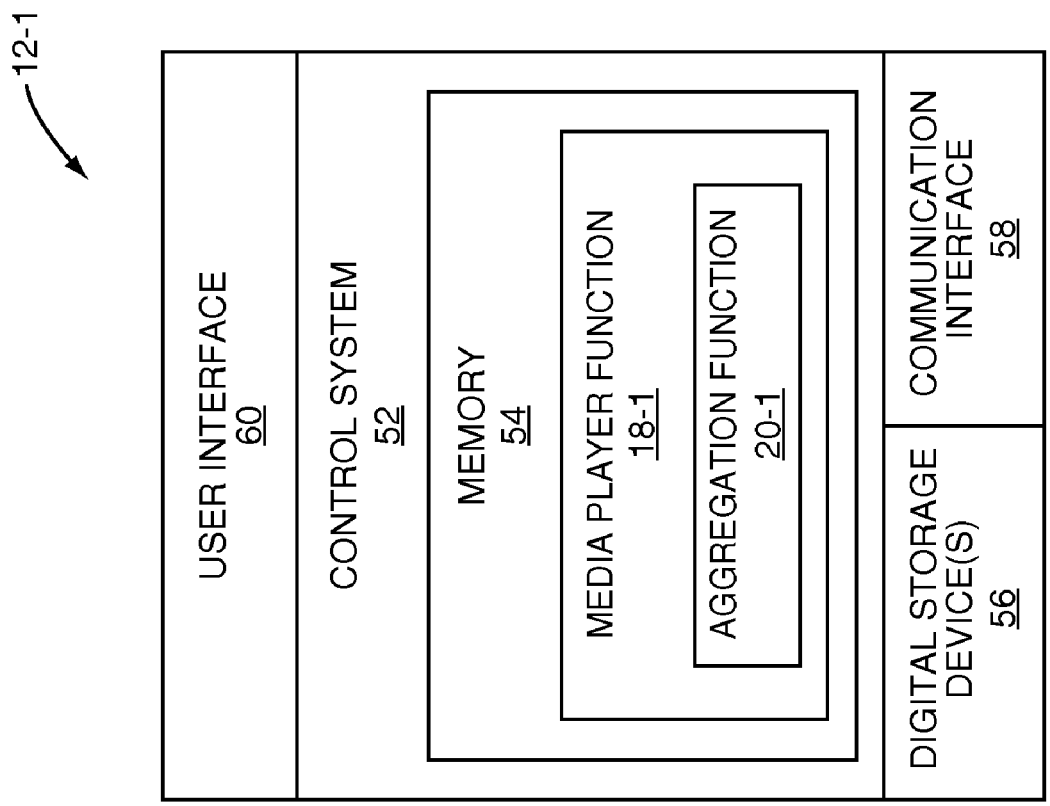

ACTIVITY INDICATORS IN A MEDIA SHARING SYSTEM

FIELD OF THE INVENTION

The present invention relates to a media sharing system.

BACKGROUND OF THE INVENTION

There is an enormous amount of digital media content currently available to consumers. For example, the Apple® iTunes Store® currently hosts over 8 million songs. However, since no single user owns all of the available content and because users often desire to experience new content, numerous media sharing services have been developed. One such media sharing service is disclosed on commonly owned and assigned U.S. patent application Ser. No. 12/104,572, entitled METHOD AND SYSTEM FOR AGGREGATING MEDIA COLLECTIONS BETWEEN PARTICIPANTS OF A SHARING NETWORK, which was filed on Apr. 17, 2008. Another exemplary media sharing service is provided by the Apple® iTunes® media player, which enables up to five (5) users to share their music collections over a Local Area Network (LAN). There is a desire to enable participants in such a media sharing system to quickly and easily be informed of playback activity within the media sharing system.

SUMMARY OF THE INVENTION

The present invention relates to generating and displaying one or more indicators indicative of a level of activity within a media sharing system. In one embodiment, with respect to a user participating in the media sharing system, an indicator representative of an activity level of a media collection shared by the user in the media sharing system may be generated and presented to the user. In addition or alternatively, indicators representative of activity levels of media collections shared by other users participating in the media sharing system may be generated and presented to the user. Still further, in addition or alternatively, indicators representative of activity levels with respect to playlists in the media sharing system may be generated and presented to the user.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 4 is a block diagram of an exemplary embodiment of one of the user devices of FIG. 1.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
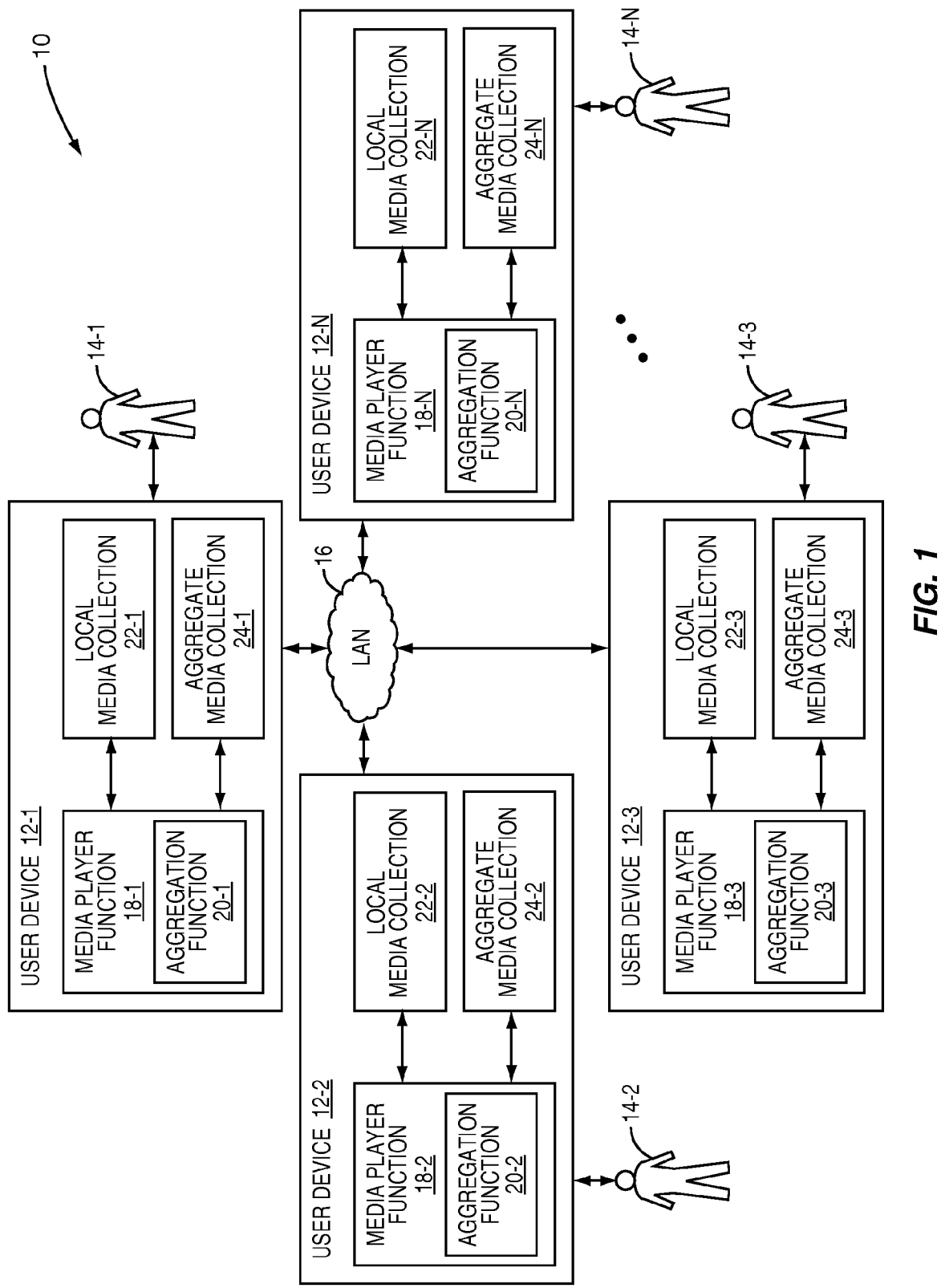
FIG. 1 illustrates a media sharing system according to one embodiment of the present invention.

FIG. 1 illustrates an exemplary media sharing system 10 in which indicators of activity within the media sharing system 10 are generated and displayed to users according to one embodiment of the present invention. In general, the media sharing system 10 includes a number of user devices 12-1 through 12-N having associated users 14-1 through 14-N. In this embodiment, the user devices 12-1 through 12-N are connected via a Local Area Network (LAN) 16 and are part of the same subnetwork. However, the present invention is not limited thereto. The user devices 12-1 through 12-N may alternatively be connected via a Wide Area Network (WAN), a global network such as the Internet, or the like. As yet another alternative, some of the user devices 12-1 through 12-N may be connected via a LAN while others are connected via a WAN or global network.

Each of the user devices 12-1 through 12-N may be, for example, a personal computer, a mobile smart phone, a set-top box, a portable media player, or the like. Looking at the user device 12-1, the user device 12-1 includes a media player function 18-1 which may be implemented in software, hardware, or a combination thereof. In addition to providing media playback capabilities, the media player function 18-1 includes an aggregation function 20-1. In an alternative embodiment, the aggregation function 20-1 may be implemented as a separate function. For example, if the media player function 18-1 is a software media player application, the aggregation function 20-1 may be implemented as a plug-in. In general, the aggregation function 20-1 operates to generate an aggregate media collection 24-1 for the user 14-1 including media items in a local media collection 22-1 of the user 14-1 and media items from one or more remote shared media collections of one or more of the other user 14-2 through 14-N.

In addition, as discussed below, the aggregation function 20-1 generates and displays activity indicators. The activity indictors may include an indicator of an overall activity level of the local media collection 22-1 of the user 14-1 within the media sharing system 10, indicators of activity levels of one or more shared media collections, indicators of activity levels of one or more playlists, or the like, or any combination thereof. The activity level of the local media collection 22-1 may be determined based on or may otherwise reflect the number or percentage of other users 14-2 through 14-N that are currently playing, have recently played, or are expected to play media items included the local media collection 22-1 of the user 14-1. The activity level of a shared media collection may be determined based on or may otherwise reflect the number or percentage of users 14-1 through 14-N that are currently playing, have recently played, or are expected to play media items included the shared media collection. The activity level of a playlist may be determined based on or may otherwise reflect the number or percentage of users 14-1 through 14-N that are currently playing or have recently played the playlist.

Like the user device 12-1, the other user devices 12-2 through 12-N include media player functions 18-2 through 18-N having corresponding aggregation functions 20-2 through 20-N. In addition, the other user devices 12-2 through 12-N include local media collections 22-2 through 22-N and aggregate media collections 24-2 through 24-N, respectively.

Figure 2A:
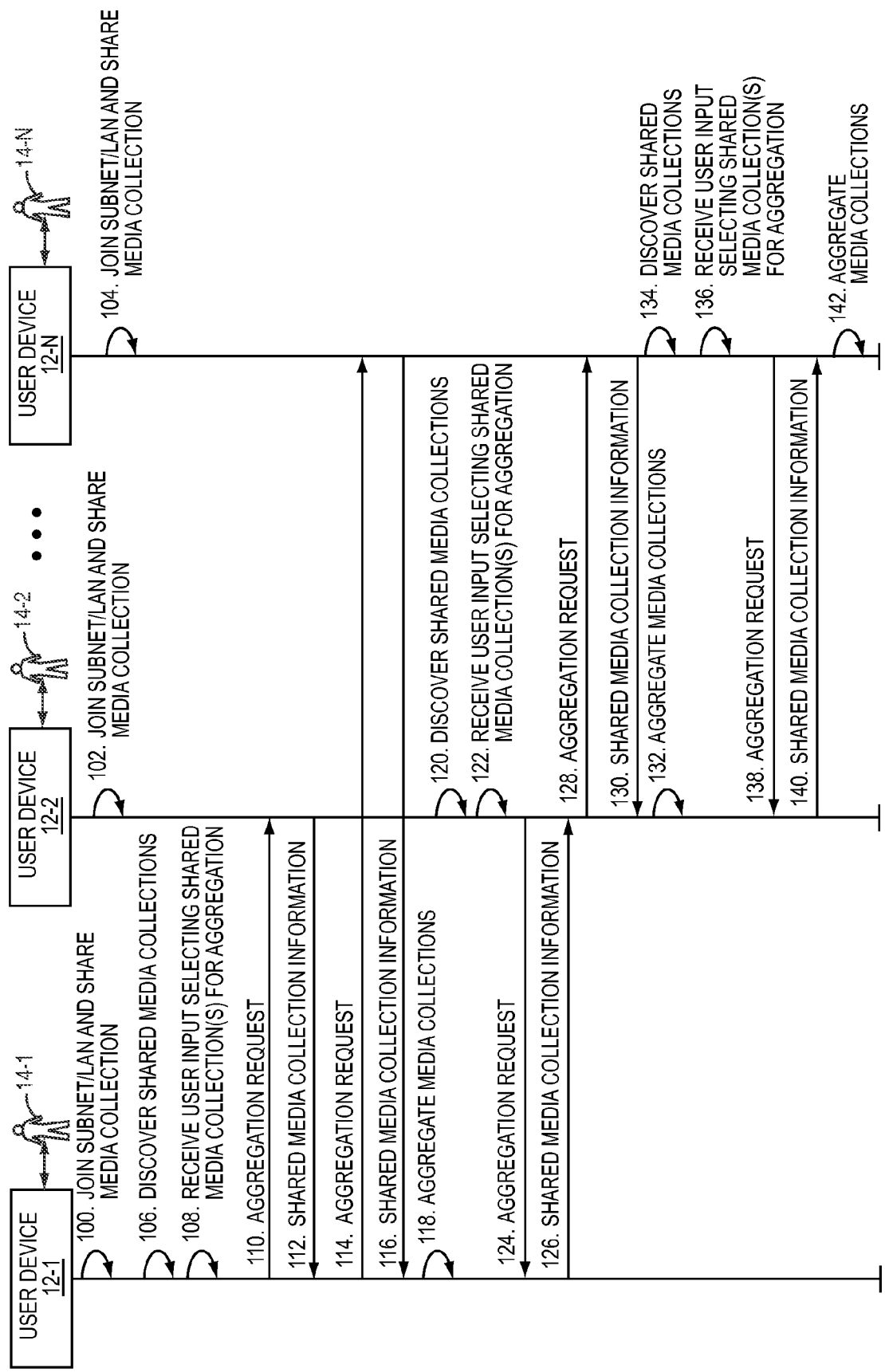
FIGS. 2A and 2B illustrate the operation of the media sharing system of FIG. 1 according to one embodiment of the present invention.
Figure 2B:
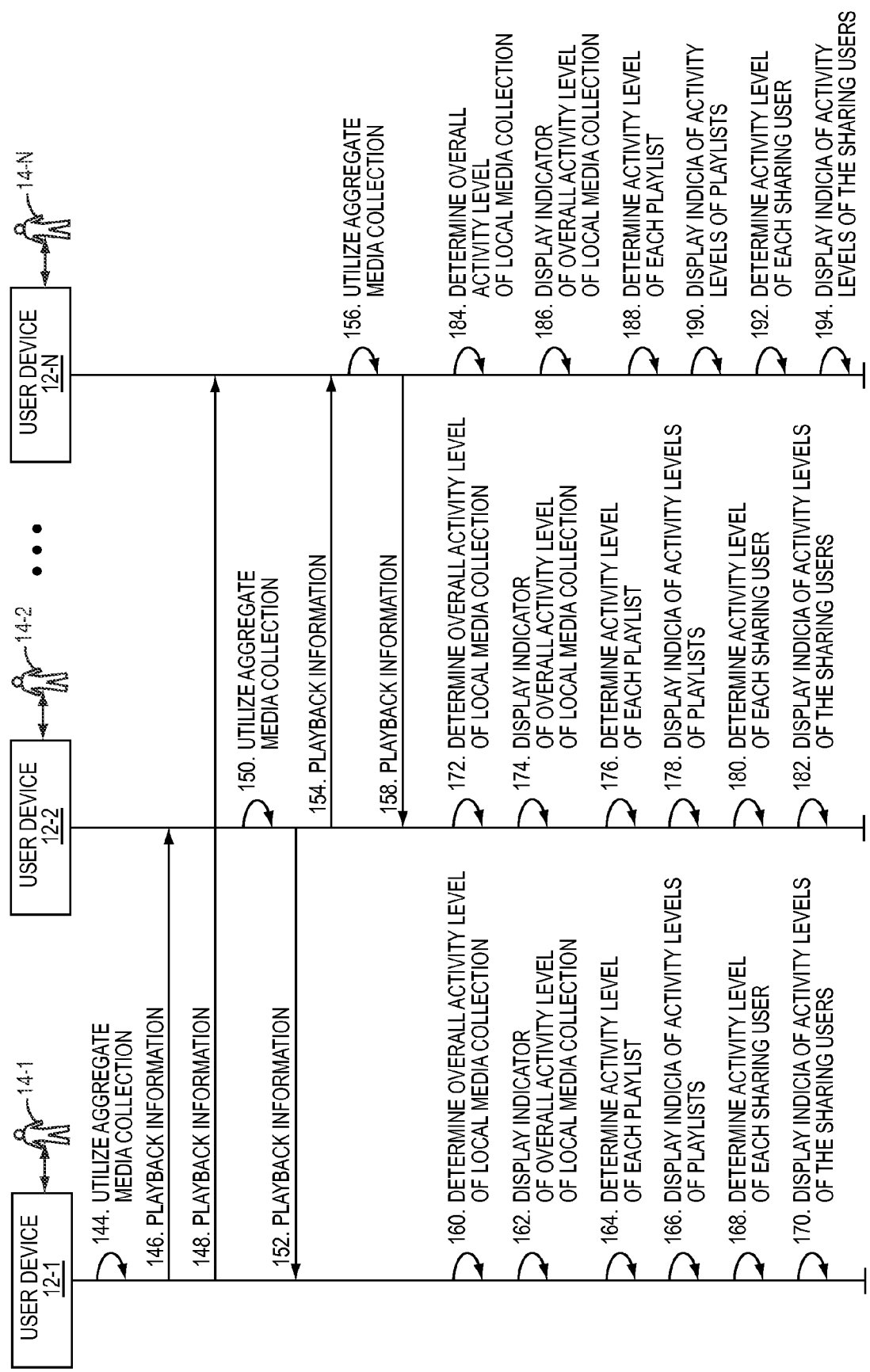

FIGS. 2A and 2B illustrate the operation of the media sharing system 10 of FIG. 1 according to one embodiment of the present invention. First, the user devices 12-1 and 12-2 through 12-N join the LAN 16 by, for example, coming online (steps 100-104). Next, the aggregation function 20-1 of the user device 12-1 identifies, or discovers, media collections shared by the users 14-2 through 14-N of the user devices 12-2 through 12-N (step 106). For example, in a MAC OSX or Windows environment where the user devices 12-1 through 12-N are connected via the LAN 16, Bonjour may be used to identify the shared media collections of the users 14-2 through 14-N. The media collections shared by the users 14-2 through 14-N are preferably the local media collections 22-2 through 22-N of the users 14-2 through 14-N. However, the present invention is not limited thereto. In one exemplary alternative embodiment, the media collections shared by the users 14-2 through 14-N may be the aggregate media collections 24-2 through 24-N of the users 14-2 through 14-N. In this embodiment, the aggregation function 20-1 of the user device 12-1 presents a list of the shared media collections of the users 14-2 through 14-N to the user 14-1 and then receives user input from the user 14-1 selecting one or more of the shared media collections for aggregation (step 108). In this example, the user 14-1 selects at least the shared media collections of the users 14-2 and 14-N, which are hosted by the user devices 12-2 and 12-N, respectively.

The aggregation function 20-1 of the user device 12-1 then issues an aggregation request to the user device 12-2 of the user 14-2 (step 110). In response, in this embodiment, the aggregation function 20-2 of the user device 12-2 returns information, which is also referred to herein as shared media collection information, identifying media items in the shared media collection of the user 14-2 to the user device 12-1 of the user 14-1 (step 112). Likewise, the aggregation function 20-1 of the user device 12-1 issues an aggregation request to the user device 12-N of the user 14-N (step 114). In response, the aggregation function 20-N of the user device 12-N returns information identifying media items in the shared media collection of the user 14-N to the user device 12-1 of the user 14-1 (step 116). Note that aggregation requests may also be issued to and shared media collection information received from other user devices from the user devices 12-3 through 12-N-1 (not shown) hosting shared media collections selected by the user 14-1.

Upon receiving the shared media collection information, the aggregation function 20-1 of the user device 12-1 aggregates or merges the local media collection 22-1 of the user 14-1 and the shared media collections to provide the aggregate media collection 24-1 of the user 14-1 (step 118). More specifically, in one embodiment, the aggregation function 20-1 aggregates the shared media collection information identifying the media items in the shared media collections selected by the user 14-1 for aggregation and information identifying the media items in the local media collection 22-1 of the user 14-1 to provide a list of unique media items available either from the local media collection 22-1 of the user 14-1 or one of the shared media collections selected by the user 14-1 for aggregation. In addition, for each unique media item, a secondary list of available sources for the unique media item may be generated. Together, the list of unique media items and the corresponding secondary lists of sources for the unique media items form the aggregate media collection 24-1 of the user 14-1. For more information, the interested reader is directed to commonly owned and assigned U.S. patent application Ser. No. 12/104,572, entitled METHOD AND SYSTEM FOR AGGREGATING MEDIA COLLECTIONS BETWEEN PARTICIPANTS OF A SHARING NETWORK, which was filed on Apr. 17, 2008 and is hereby incorporated herein by reference in its entirety. Note that while the discussion herein focuses on an embodiment where the shared media collections are aggregated with the local media collection 22-1 of the user 14-1, the present invention is not limited thereto. The user 14-1 may choose not to select his local media collection 22-1 for aggregation, in which case the shared media collections would be aggregated with one another to provide the aggregate media collection 24-1 of the user 14-1.

In addition to including media items, the aggregate media collection 24-1 of the user 14-1 may include an aggregate list of playlists. More specifically, the local media collection 22-1 of the user 14-1 as well the shared media collections selected by the user 14-1 for aggregation may include static or dynamic playlists. Information identifying the playlists may then be included within or provided in association with the shared media collection information. Then, when generating the aggregate media collection 24-1, the aggregation function 20-1 of the user device 12-1 may also aggregate the playlists of the shared media collections selected by the user 14-1 and the playlists in the local media collection 22-1 of the user 14-1. When aggregating playlists, a list of unique playlists may be generated. As used herein, a unique playlist is a playlist having a unique title. Playlists having the same title may be combined or merged. For example, an "80s" playlist of the user 14-1 may be combined with an "80s" playlist of the user 14-2 to provide an aggregate "80s" playlist including both the media items from the "80s" playlist of the user 14-1 and the media items from the "80s" playlist of the user 14-2.

In a similar fashion, the aggregation function 20-2 of the user device 12-2 identifies, or discovers, media collections shared by the users 14-1 and 14-3 through 14-N of the user devices 12-1 and 12-3 through 12-N (step 120). In this embodiment, the aggregation function 20-2 of the user device 12-2 presents a list of the shared media collections of the users 14-1 and 14-3 through 14-N to the user 14-2 and then receives user input from the user 14-2 selecting one or more of the shared media collections for aggregation (step 122). In this example, the user 14-2 selects at least the shared media collections of the users 14-1 and 14-N, which are hosted by the user devices 12-1 and 12-N, respectively.

The aggregation function 20-2 of the user device 12-2 then issues an aggregation request to the user device 12-1 of the user 14-1 (step 124). In response, in this embodiment, the aggregation function 20-1 of the user device 12-1 returns information identifying media items in the shared media collection of the user 14-1 to the user device 12-2 of the user 14-2 (step 126). Likewise, the aggregation function 20-2 of the user device 12-2 issues an aggregation request to the user device 12-N of the user 14-N (step 128). In response, the aggregation function 20-N of the user device 12-N returns information identifying media items in the shared media collection of the user 14-N to the user device 12-2 of the user 14-2 (step 130). Note that aggregation requests may also be issued to and shared media collection information received from other user devices from the user devices 12-3 through 12-N-1 (not shown) hosting shared media collections selected by the user 14-2.

Upon receiving the shared media collection information, the aggregation function 20-2 of the user device 12-2 aggregates or merges the local media collection 22-2 of the user 14-2 and the shared media collections selected by the user 14-2 for aggregation to provide the aggregate media collection 24-2 of the user 14-2 (step 132). Further, as discussed above, in addition to including media items, the aggregate media collection 24-2 of the user 14-2 may include an aggregate list of playlists.

Like the aggregation functions 20-1 and 20-2 of the user devices 12-1 and 12-2, respectively, the aggregation function 20-N of the user device 12-N identifies, or discovers, media collections shared by the users 14-1 through 14-N-1 (not shown) of the user devices 12-1 through 12-N-1 (step 134). In this embodiment, the aggregation function 20-N of the user device 12-N presents a list of the shared media collections of the users 14-1 through 14-N-1 to the user 14-N and then receives user input from the user 14-N selecting one or more of the shared media collections for aggregation (step 136). In this example, the user 14-N selects at least the shared media collection of the user 14-2, which is hosted by the user device 12-2, but does not select the shared media collection of the user 14-1.

The aggregation function 20-N of the user device 12-N then issues an aggregation request to the user device 12-2 of the user 14-2 (step 138). In response, in this embodiment, the aggregation function 20-2 of the user device 12-2 returns information identifying media items in the shared media collection of the user 14-2 to the user device 12-N of the user 14-N (step 140). Upon receiving the shared media collection information, the aggregation function 20-N of the user device 12-N aggregates or merges the local media collection 22-N of the user 14-N and the shared media collection(s) selected by the user 14-N for aggregation to provide the aggregate media collection 24-N of the user 14-N (step 142). Further, as discussed above, in addition to including media items, the aggregate media collection 24-N of the user 14-N may include an aggregate list of playlists.

Once the aggregate media collection 24-1 of the user 14-1 is generated, the user 14-1 may utilize the aggregate media collection 24-1 in much the same manner as using the local media collection 22-1 (step 144). For example, the user 14-1 may select media items from the aggregate media collection 24-1 for playback, generate playlists including media items from the aggregate media collection 24-1, generate smart or dynamic playlists that are populated from the aggregate media collection 24-1, play media items in an existing playlist, or the like. In one embodiment, in order to provide playback of a media item that is from a shared media collection of another user, the media item is requested from the user device hosting the shared media collection and streamed from that user device to the user device 12-1 of the user 14-1. For example, if the user 14-1 initiates playback of a media item and that media item's source is the user device 12-2, the media player function 18-1 of the user device 12-1 requests the media item from the user device 12-2. In response, the user device 12-2, and specifically the media player function 18-2 of the user device 12-2, delivers the media item to the user device 12-1 for playback. In the preferred embodiment, the media item is delivered via streaming.

Periodically or in response to predetermined triggering events, the aggregation function 20-1, or the media player function 18-1, of the user device 12-1 sends playback information to the user devices 12-2 and 12-N hosting the shared media collections selected by the user 14-1 for aggregation (steps 146 and 148). Alternatively, the playback information may be sent to all of the user devices 12-2 through 12-N connected to the LAN 16 regardless of whether the corresponding shared media collections have been selected by the user 14-1 for aggregation. The playback information may be sent periodically such as, for example, every 15 minutes. Alternatively, the playback information may be sent in response to one or more defined triggering events such as, for example, the start of playback of a media item, the start of playback of every Xth media item where X is a predetermined or user configurable number equal to or greater than one (1), the completion of playback of a media item, the completion of playback of every Yth media item where Y is a predetermined or user configurable number equal to or greater than one (1), the start of playback of a playlist, or the like. The playback information includes information identifying the media item or media items played by the media player function 18-2 of the user device 12-2 since the last time playback information was sent, information identifying one or more media items expected to be played next by the media player function 18-1 of the user device 12-1, information identifying a playlist currently being played by the media player function 18-1 of the user device 12-1, or any combination thereof. The one or more media items expected to be played next by the media player function 18-1 of the user device 12-1 may be the next M media items in the playlist currently being played by the media player function 18-1, where M is a predetermined or user configurable number equal to or greater than one (1).

Likewise, the aggregate media collection 24-2 of the user 14-2 may be utilized by the user 14-2 at the user device 12-2 in much the same manner as using the local media collection 22-2 (step 150). In addition, periodically or in response to predetermined triggering events, the media player function 18-2 and/or the aggregation function 20-2 of the user device 12-2 sends playback information to the user devices 12-1 and 12-N hosting the shared media collections selected by the user 14-2 for aggregation (steps 152 and 154). Alternatively, the playback information may be sent to all of the user devices 12-1 and 12-3 through 12-N connected to the LAN 16 regardless of whether the corresponding shared media collections have been selected by the user 14-2 for aggregation. Again, the playback information includes information identifying the media item or media items played by the media player function 18-2 of the user device 12-2 since the last time playback information was sent, information identifying one or more media items expected to be played next by the media player function 18-2 of the user device 12-2, information identifying a playlist currently being played by the media player function 18-2 of the user device 12-2, or any combination thereof.

Similarly, the aggregate media collection 24-N of the user 14-N may be utilized by the user 14-N at the user device 12-N in much the same manner as using the local media collection 22-N (step 156). In addition, periodically or in response to predetermined triggering events, the media player function 18-N and/or the aggregation function 20-N of the user device 12-N sends playback information to the user device 12-2 hosting the shared media collection selected by the user 14-N for aggregation (step 158). Alternatively, the playback information may be sent to all of the user devices 12-1 through 12-N-1 (not shown) connected to the LAN 16 regardless of whether the corresponding shared media collections have been selected by the user 14-N for aggregation. Again, the playback information includes information identifying the media item or media items played by the media player function 18-N of the user device 12-N since the last time playback information was sent, information identifying one or more media items expected to be played next by the media player function 18-N of the user device 12-N, information identifying a playlist currently being played by the media player function 18-N of the user device 12-N, or any combination thereof.

Based on the received playback information and, optionally, previously received playback information, the aggregation function 20-1, or the media player function 18-1 of the user device 12-1, determines an overall activity level of the local media collection 22-1 of the user 14-1 in the media sharing system 10 (step 160) and displays a corresponding activity indictor to the user 14-1 at the user device 12-1 (step 162). The overall activity level may be determined based on a number or percentage of media items included in the local media collection 22-1 of the user 14-1 that are currently being played by one or more other users, a number or percentage of media items included in the local media collection 22-1 of the user 14-1 that have recently been played by one or more other users, a number or percentage of media items included in the local media collection 22-1 of the user 14-1 that are expected to be played by one or more other users, a number or percentage of other users that are currently playing a playlist included in the local media collection 22-1 of the user 14-1, or any combination thereof. In addition, the overall activity level of the media collection 22-1 of the user 14-1 may take into account how recently the playback activity identified by the playback information occurred such that more recent playback activities influence the activity level of the playlist more than less recent playback activities.

In one embodiment, if a particular media item identified by the playback information has multiple sources in the media sharing system 10, including the user device 12-1, that media item is still counted when determining the overall activity level of the local media collection 22-1 of the user 14-1 even though the user device 12-1 may or may not operate as the source for the media item for all or any of the other user devices that are currently playing, have recently played, or are expected to play the media item. In another embodiment, the playback information not only identifies media items currently being played, recently played, and/or expected to be played, but also identifies the source(s) from which the media items are, have, or will be obtained. As such, when determining the overall activity level of the local media collection 22-1 of the user 14-1, only media items included in the local media collection 22-1 and sourced or to be sourced by the user device 12-1 are counted. Similarly, in yet another embodiment, the overall activity level of the local media collection 22-1 of the user 14-1 is a function of only media items included in the local media collection 22-1 that are being sourced or are to be sourced from the user device 12-1 and that are not available to the other user devices 12-2 through 12-N from any of the other shared media collections.

When determining the overall activity level of the local media collection 22-1 of the user 14-1, a time-window may be defined such that previously received playback information that was received outside of the time-window is discarded. For example, the time-window might be one (1) hour such that only the currently received playback information and playback information received within the last hour are used to determine the overall activity level of the local media collection 22-1 of the user 14-1. In addition or alternatively, user weights may be assigned to the other users 14-2 through 14-N by the user 14-1. These user weights may then be used to weight the received playback information such that playback information received from the user devices of other users having higher weights have a greater influence on the overall activity level of the local media collection 22-1 of the user 14-1 than playback information received from the user devices of other users having lower weights.

In addition or alternatively, based on the received playback information and, optionally, previously received playback information, the aggregation function 20-1, or the media player function 18-1, of the user device 12-1 determines an activity level of at least a subset of the playlists in the aggregate media collection 24-1 of the user 14-1 (step 164) and displays corresponding indictors to the user 14-1 in association with the playlists (step 166). The activity level of a playlist may be determined based on the number or percentage of users that are currently playing the playlist or the number or percentage of users that are currently playing or have recently played the playlist. In addition, the activity level of the playlist may take into account how recently the playback activity identified by the playback information occurred such that more recent playback activities influence the activity level of the playlist more than less recent playback activities.

Note that when determining the activity level of the playlists, a time-window may be defined such that previously received playback information that was received outside of the time-window is discarded. For example, the time-window might be one (1) hour such that only the currently received playback information and playback information received within the last hour are used to determine the activity level of the playlists. In addition or alternatively, user weights may be assigned to the other users 14-2 through 14-N by the user 14-1. These user weights may then be used to weight the received playback information such that playback information received from the user devices of other users having higher weights have a greater influence on the activity level of the playlists than playback information received from the user devices of other users having lower weights.

In addition or alternatively, based on the received playback information and, optionally, previously received playback information, the aggregation function 20-1, or the media player function 18-1, of the user device 12-1 determines activity levels of the users sharing the shared media collections selected by the user 14-1 for aggregation (step 168) and displays corresponding indictors to the user 14-1 in association with identifiers of the shared media collections of those users (step 170). The activity levels of the sharing users may also be referred to herein as activity levels of the corresponding shared media collections. The activity level of a sharing user may be determined based on a number or percentage of the media items in the shared media collection of the sharing user that are currently being played by one or more other users, a number or percentage of the media items in the shared media collection of the sharing user that have recently been played by one or more other users, a number or percentage of the media items in the shared media collection of the sharing user that are expected to be played by one or more other users, a number or percentage of other users that are currently playing a playlist from the shared media collection of the sharing user, or any combination thereof. In addition, the activity level of the sharing user may take into account how recently the playback activity identified by the playback information occurred such that more recent playback activities influence the activity level of the shared media collection more than less recent playback activities.

In one embodiment, if a particular media item identified by the playback information has multiple sources in the media sharing system 10 including the user device 12-1, that media item is still counted when determining the activity level of the shared media collection even though the user device sharing the shared media collection may or may not operate as the source for the media item for all or any of the user devices that are currently playing, have recently played, or are expected to play the media item. In another embodiment, the playback information not only identifies media items currently being played, recently played, and/or expected to be played, but also identifies the source(s) from which the media items are, have, or will be obtained. As such, when determining the overall activity level of the shared media collection, only media items included in the shared media collection and sourced or to be sourced by the user device sharing the shared media collection are counted. Similarly, in yet another embodiment, the overall activity level of the shared media collection is a function of only media items included in the shared media collection that are being sourced or are to be sourced from the user device hosting the shared media collection and that are not available to the other user devices from any of the other shared media collections.

When determining the activity level of the sharing users, a time-window may be defined such that previously received playback information that was received outside of the time-window is discarded. For example, the time-window might be one (1) hour such that only the currently received playback information and playback information received within the last hour are used to determine the activity level of the sharing users. In addition or alternatively, user weights may be assigned to the other users 14-2 through 14-N by the user 14-1. These user weights may then be used to weight the received playback information such that playback information received from the user devices of other users having higher weights have a greater influence on the activity level of the sharing users than playback information received from the user devices of other users having lower weights. In a similar manner, overall activity levels, playlist activity levels, and/or sharing user activity levels may be determined by the aggregation functions 20-2 and 20-N, or the media players 18-2 and 18-N, of the user devices 12-2 and 12-N, respectively, and displayed to the users 14-2 and 14-N (steps 172-194).

Figure 3:
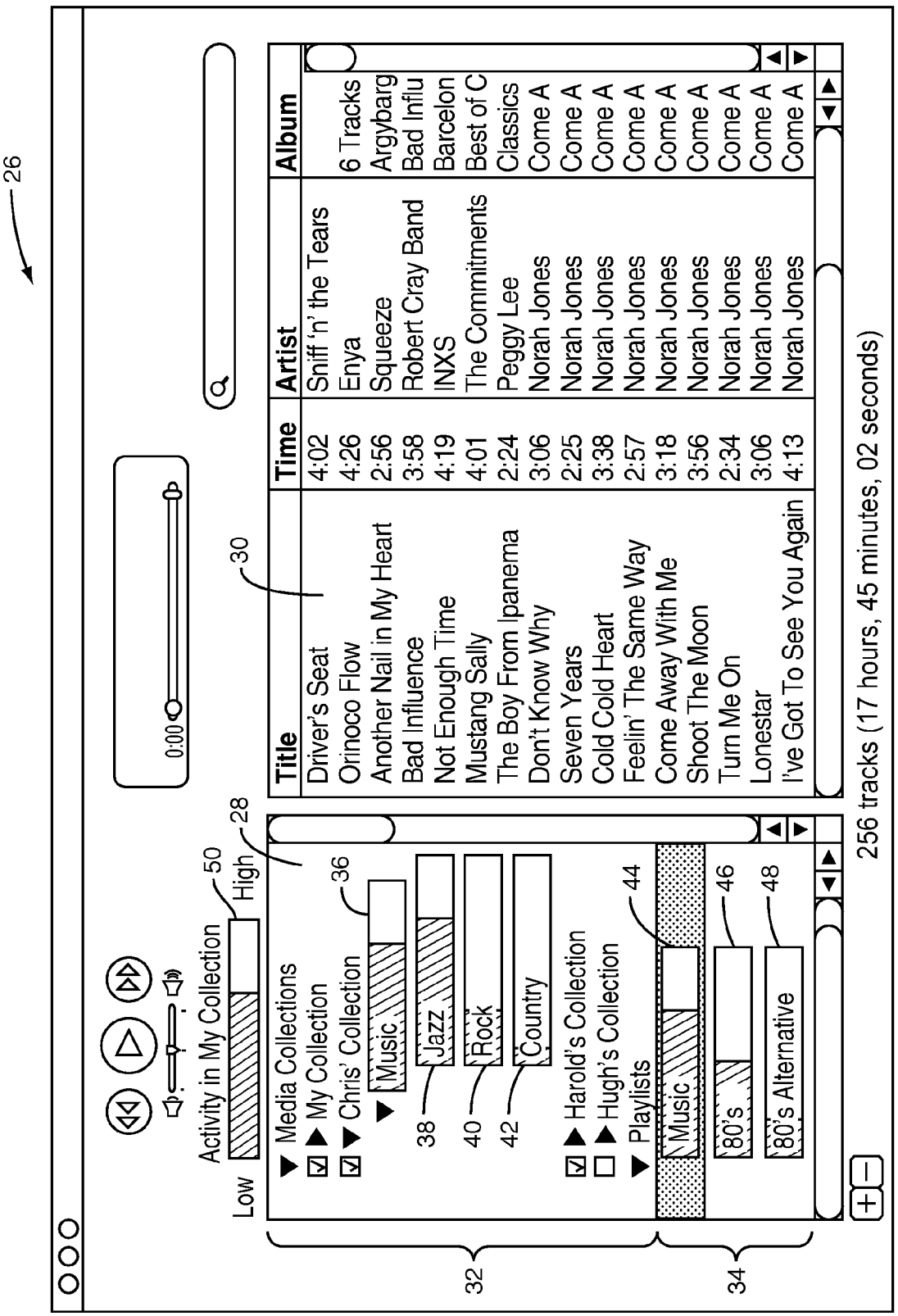
FIG. 3 is an exemplary Graphical User Interface (GUI) including activity indictors with respect to the media sharing system according to one embodiment of the present invention.

FIG. 3 illustrates an exemplary Graphical User Interface (GUI) 26 for displaying activity indicators with respect to the media sharing system 10 according to one embodiment of the present invention. In this example, the media sharing system 10 is a music sharing system. However, the present invention is not limited thereto. The media sharing system 10 may enable sharing of media collections that include audio content such as songs, podcasts, or audio books; video content such as movies, television programs, video clips, or user-generated videos; or the like, or any combination thereof.

The GUI 26 includes a navigation area 28 and a display area 30. The navigation area 28 includes a media collection selection area 32 and a playlist selection area 34. Using the user 14-1 as an example, the media collection selection area 32 is used to present a list of media collections available to the user 14-1. In this example, the list of media collections available to the user 14-1 includes the local media collection 22-1 of the user 14-1 which has the title "My Collection" and three shared media collections having the titles "Chris's Collection," "Harold's Collection," and "Hugh's Collection." In this example, the user 14-1 has selected his local media collection 22-1 having the title "My Collection" and the shared media collections having the titles "Chris's Collection" and "Harold's Collection" for aggregation. Further, by selecting the "Music" playlist, a list of the unique songs in the aggregate music collection of the user 14-1 is presented in the display area 30.

Within the media collection selection area 32, an activity indicator 36 indicates an activity level of the shared music collection "Chris's Collection," which is also referred to herein as the activity level of the corresponding sharing user. In this example, the activity indictor 36 is hierarchical and can be expanded as shown in order to display a number of activity indictors 38, 40, and 42 indicating activity levels for corresponding subgroups of the music collection "Chris's Collection." In this example, the subgroups are music genres. However, the present invention is not limited thereto. For example, there may additionally or alternatively be subgroups for time periods such as decades. In a similar fashion, activity indicators may be presented to the user 14-1 for the other selected shared media collection "Harold's Collection" and, optionally, the local media collection 22-1 of the user 14-1. In a similar manner, the playlist selection area 34 includes a list of playlists in the aggregate media collection 24-1 of the user 14-1. Activity indicators 44, 46, and 48 indicate the activity levels for the corresponding playlists.

In addition to the activity indicators 38-48, the GUI 26 also includes an overall activity indicator 50 indicating the activity level for the local media collection 22-1 of the user 14-1. Alternatively, the overall activity indicator 50 may be presented in association with the "My Collection" identifier in the media collection selection area 32 in a manner similar to that discussed above with respect to the shared media collection "Chris's Collection."

FIG. 4 is a block diagram of an exemplary embodiment of the user device 12-1 of FIG. 1. This discussion is equally applicable to the other user devices 12-2 through 12-N. In general, the user device 12-1 includes a control system 52 having associated memory 54. In this example, the media player function 18-1 including the aggregation function 20-1 is implemented in software and stored in the memory 54. However, the present invention is not limited thereto. The media player function 18-1 including the aggregation function 20-1 may be implemented in software, hardware, or a combination thereof. The user device 12-1 also includes one or more digital storage devices 56 such as, for example, one or more hard disk drives or the like. In one embodiment, the local media collection 22-1 and the aggregate media collection 24-1 are stored in the one or more digital storage devices 56. However, the present invention is not limited thereto. The user device 12-1 also includes a communication interface 58 communicatively coupling the user device 12-1 to the LAN 16. The communication interface 58 may be a wired or wireless connection. For example, the communication interface 58 may be an Ethernet connection, an IEEE 802.11x connection, or the like. The user device 12-1 also includes a user interface 60, which may include components such as, but not limited to, one or more user input devices, a display, a speaker, or the like.

Those skilled in the art will recognize improvements and modifications to the preferred embodiments of the present invention. All such improvements and modifications are considered within the scope of the concepts disclosed herein and the claims that follow.

What is claimed is:

1. A method of operation of a user device of a user comprising:

joining a media sharing system with a plurality of other user devices of a corresponding plurality of other users such that the user device shares a local media collection of the user hosted by the user device with one or more first user devices of the plurality of other user devices and has access to one or more shared media collections hosted by corresponding one or more second user devices of the plurality of other user devices;

receiving playback information from at least a subset of the plurality of other user devices;

based on the playback information, determining one or more activity levels selected from a group consisting of:

an overall activity level of the local media collection shared by the user device in the media sharing system, an activity level of each of the one or more shared media collections shared by one or more of the plurality of other user devices in the media sharing system, and an activity level of each of one or more playlists in the media sharing system; and presenting one or more activity indicators representative of the one or more activity levels to the user at the user device.

2. The method of claim 1 wherein the playback information for each user device of the at least a subset of the plurality of other user devices comprises information identifying a media item currently playing at the user device.

3. The method of claim 1 wherein the playback information for each user device of the at least a subset of the plurality of other user devices comprises information identifying one or more media items played at the user device.

4. The method of claim 1 wherein the playback information for each user device of the at least a subset of the plurality of other user devices comprises information identifying one or more media items expected to be played at the user device.

5. The method of claim 1 wherein the playback information for each user device of the at least a subset of the plurality of other user devices comprises information identifying a playlist being played at the user device.

6. The method of claim 1 wherein determining the one or more activity levels comprises determining the one or more activity levels based on the playback information and previously received playback information received during a defined time-window.

7. The method of claim 1 wherein determining the one or more activity levels comprises determining the one or more activity levels based on the playback information and weights assigned to users of the at least a subset of the plurality of other user devices.

8. The method of claim 1 wherein the one or more activity levels comprise the overall activity level of the local media collection shared by the user device, and determining the overall activity level of the local media collection comprises determining the overall activity level based on one or more criteria determined from the playback information.

9. The method of claim 8 wherein the one or more criteria comprise at least one of a group consisting of a number of users currently playing media items included in the local media collection and a percentage of users currently playing media items included in the local media collection.

10. The method of claim 8 wherein the one or more criteria comprise at least one of a group consisting of a number of users that have recently played media items included in the local media collection and a percentage of users that have recently played media items included in the local media collection.

11. The method of claim 8 wherein the one or more criteria comprise at least one of a group consisting of a number of users expected to play media items included in the local media collection and a percentage of users expected to play media items included in the local media collection.

12. The method of claim 8 wherein the one or more criteria comprise at least one of a group consisting of a number of users playing a playlist included in the local media collection and a percentage of users playing a playlist included in the local media collection.

13. The method of claim 8 wherein the one or more criteria comprise at least one of a group consisting of a number of users currently playing media items included in the local media collection and being sourced by the user device and a percentage of users currently playing media items included in the local media collection and being sourced by the user device.

14. The method of claim 8 wherein the one or more criteria comprise at least one of a group consisting of a number of users that have recently played media items included in the local media collection and that were sourced by the user device and a percentage of users that have recently played media items included in the local media collection and that were sourced by the user device.

15. The method of claim 8 wherein the one or more criteria comprise at least one of a group consisting of a number of users expected to play media items included in the local media collection and expected to be sourced by the user device and a percentage of users expected to play media items included in the local media collection and expected to be sourced by the user device.

16. The method of claim 8 wherein the one or more criteria comprise at least one of a group consisting of a number of users currently playing media items included in the local media collection and being sourced only by the user device and a percentage of users currently playing media items included in the local media collection and being sourced only by the user device.

17. The method of claim 8 wherein the one or more criteria comprise at least one of a group consisting of a number of users expected to play media items included in the local media collection and sourced only by the user device and a percentage of users expected to play media items included in the local media collection and sourced only by the user device.

18. The method of claim 1 wherein the one or more activity levels comprise an activity level for each shared media collection of the one or more shared media collections, and determining the one or more activity levels for the shared media collection comprises determining the activity level for the shared media collection based on one or more criteria determined from the playback information.

19. The method of claim 18 wherein the one or more criteria comprise at least one of a group consisting of a number of users currently playing media items included in the shared media collection and a percentage of users currently playing media items included in the shared media collection.

20. The method of claim 18 wherein the one or more criteria comprise at least one of a group consisting of a number of users that have recently played media items included in the shared media collection and a percentage of users that have recently played media items included in the shared media collection.

21. The method of claim 18 wherein the one or more criteria comprise at least one of a group consisting of a number of users expected to play media items included in the shared media collection and a percentage of users expected to play media items included in the shared media collection.

22. The method of claim 18 wherein the one or more criteria comprise at least one of a group consisting of a number of users playing a playlist included in the shared media collection and a percentage of users playing a playlist included in the shared media collection.

23. The method of claim 18 wherein the one or more criteria comprise at least one of a group consisting of a number of users currently playing media items included in the shared media collection and being sourced by a user device of the plurality of other user devices sharing the shared media collection and a percentage of users currently playing media items included in the shared media collection and being sourced by the user device sharing the shared media collection.

24. The method of claim 18 wherein the one or more criteria comprise at least one of a group consisting of a number of users that have recently played media items included in the shared media collection and that were sourced by a user device of the plurality of other user devices sharing the shared media collection and a percentage of users that have recently played media items included in the shared media collection and that were sourced by the user device sharing the shared media collection.

25. The method of claim 18 wherein the one or more criteria comprise at least one of a group consisting of a number of users expected to play media items included in the shared media collection and expected to be sourced by a user device of the plurality of other user devices sharing the shared media collection and a percentage of users expected to play media items included in the shared media collection and expected to be sourced by the user device sharing the shared media collection.

26. The method of claim 18 wherein the one or more criteria comprise at least one of a group consisting of a number of users currently playing media items included in the shared media collection and sourced only by a user device of the plurality of other user devices sharing the shared media collection and a percentage of users currently playing media items included in the shared media collection and sourced only by the user device sharing the shared media collection.

27. The method of claim 18 wherein the one or more criteria comprise at least one of a group consisting of a number of users expected to play media items included in the shared media collection and sourced only by a user device of the plurality of other user devices sharing the shared media collection and a percentage of users expected to play media items included in the shared media collection and sourced only by the user device sharing the shared media collection.

28. The method of claim 1 wherein the one or more activity levels comprise an activity level of each playlist of the one or more playlists, and determining the overall activity level of the local media collection comprises determining the overall activity level based on one or more criteria determined from the playback information, the one or more criteria selected from a group consisting of a number of users playing the playlist, and a percentage of users playing the playlist.

29. The method of claim 1 wherein the one or more first user devices and the one or more second user devices are the same one or more user devices.

30. The method of claim 1 wherein at least one of the one or more first user devices is not one of the one or more second user devices.

31. The method of claim 1 wherein at least one of the one or more second user devices is not one of the one or more first user devices.

32. A user device of a user comprising:
a communication interface communicatively coupling the user device to a network; and
a control system associated with the communication interface and adapted to:
join a media sharing system with a plurality of other user devices of a corresponding plurality of other users via the network such that the user device shares a local media collection of the user hosted by the user device with one or more first user devices of the plurality of other user devices and has access to one or more shared media collections hosted by corresponding one or more second user devices of the plurality of other user devices;
receive playback information from at least a subset of the plurality of other user devices;
based on the playback information, determine one or more activity levels selected from a group consisting of: an overall activity level of the local media collection shared by the user device in the media sharing system, an activity level of each of the one or more shared media collections shared by one or more of the plurality of other user devices in the media sharing system, and an activity level of each of one or more playlists in the media sharing system; and
present one or more activity indicators representative of the one or more activity levels to the user at the user device.

33. A non-transitory computer readable medium storing software for instructing a user device of a user to:
join a media sharing system with a plurality of other user devices of a corresponding plurality of other users such that the user device shares a local media collection of the user hosted by the user device with one or more first user devices of the plurality of other user devices and has access to one or more shared media collections hosted by corresponding one or more second user devices of the plurality of other user devices;
receive playback information from at least a subset of the plurality of other user devices;
based on the playback information, determine one or more activity levels selected from a group consisting of: an overall activity level of the local media collection shared by the user device in the media sharing system, an activity level of each of the one or more shared media collections shared by one or more of the plurality of other user devices in the media sharing system, and an activity level of each of one or more playlists in the media sharing system; and
present one or more activity indicators representative of the one or more activity levels to the user at the user device.

\* \* \* \* \*